US005669201A

United States Patent [19]

Simionato

[11] Patent Number: 5,669,201
[45] Date of Patent: Sep. 23, 1997

[54] DEVICE FOR SEALING BAGS OR PACKAGES IN A HEAT-SEALABLE PLASTIC MATERIAL PROVIDED WITH PARTS FOR REGULATING THE WELDING PRESSURE

[75] Inventor: Paolo Simionato, Padova, Italy

[73] Assignee: Simionato S.P.A., Padova, Italy

[21] Appl. No.: 622,139

[22] Filed: Mar. 27, 1996

[30] Foreign Application Priority Data

Apr. 7, 1995 [IT] Italy ................... MI95A0728

[51] Int. Cl.⁶ ........................................ B65B 51/10
[52] U.S. Cl. ............ 53/373.7; 53/374.4; 53/374.5; 53/551; 156/583.1
[58] Field of Search ............... 219/243; 417/396, 417/397; 53/374.4, 374.5, 374.8, 373.2, 373.7, 550–555, 375.9; 150/583.1, 583.2

[56] References Cited

U.S. PATENT DOCUMENTS

| | | | |
|---|---|---|---|
| 4,506,494 | 3/1985 | Shimoyama et al. | 53/373.4 |
| 4,529,472 | 7/1985 | Hsu | 156/583.2 |
| 4,653,986 | 3/1987 | Ashton | 417/397 |
| 4,656,818 | 4/1987 | Shimoyama et al. | 53/374.4 |
| 4,730,991 | 3/1988 | Handfield | 417/397 |
| 4,751,808 | 6/1988 | Hadden | 53/373.4 |
| 4,818,191 | 4/1989 | Schlake | 417/397 |
| 5,273,405 | 12/1993 | Chalmers et al. | 417/397 |

FOREIGN PATENT DOCUMENTS

| | | |
|---|---|---|
| 0 192 605 | 8/1986 | European Pat. Off. . |
| 0 469 819 | 2/1992 | European Pat. Off. . |

*Primary Examiner*—John Sipos
*Assistant Examiner*—Gene L. Kim
*Attorney, Agent, or Firm*—Young & Thompson

[57] ABSTRACT

A device for sealing bags or packages in a heat-sealable plastic material containing a predefined portion of product, wherein a tubular strip is longitudinally fed and filled while said sealing device, by welding the opposite edges of said tubular strip, defines a plurality of packages individually containing said predetermined portion of product, said sealing device comprising two welding plates or elements transverse to said strip and opposite one to the other and which are carried by a respective mobile support element. Between each of said welding elements and the respective mobile support at least a first and a second cylinder are provided, which can be actuated by means of a pressurized fluid, said fluid-operable cylinders comprising a respective piston or plunger and a compression chamber integral respectively with the corresponding welding element and with the corresponding support of the respective welding element, each of said pressure chambers having a connection for the pressurized fluid with a plenum element, so as to discharge therein the increase in pressure which is generated inside the chambers of the support cylinders when said welding elements come into contact one with the other.

7 Claims, 3 Drawing Sheets

DEVICE FOR SEALING BAGS OR PACKAGES IN A HEAT-SEALABLE PLASTIC MATERIAL PROVIDED WITH PARTS FOR REGULATING THE WELDING PRESSURE

FIELD OF THE INVENTION

The present invention relates to a device for sealing bags or packages in a heat-sealable plastic material. It is preferably used in a machine for packaging a loose product in bags or the like in a heat-sealable material containing a predefined portion of said product.

BACKGROUND OF THE INVENTION

In packaging machines of the type referred above a tubular strip, generally in a heat-sealable material, is longitudinally fed and filled gradually with predetermined portions of product, while the sealing device, by welding the opposite edges of the tubular strip, defines a plurality of packages each containing a predetermined portion of product, which packages are subsequently separated one from the other by cutting the strip in the welding zone in order to provide individual packages of product intended for consumption. Known sealing devices comprise two opposite welding plates, transverse to the tubular strip, which have heated surfaces for contact and welding of the strip whereby the edges of the tubular strip are welded one to the other at the welding zone. The welding plates are held by respective support elements which are driven to move cyclically, so that the two welding plates are moved one close to the other with the welding surfaces which compress one against the other the edges of the tubular strip, forcing them to weld one to the other, and are moved one away from the other to allow the passage between the welding elements of the strip containing a portion of product.

In the known sealing devices, the welding plates, after having come into contact and having pressed between them the tubular packaging strip in plastic material, maintain the contact therewith for a certain length of time, following it for a certain longitudinal section for the time required forforming the weld.

Moreover some of the known devices comprise between each of the welding elements and the respective mobile supports elastic springs which serve to damp the contact counterblow between the welding elements.

In known sealing devices, the supports and the relevant sealing plates are made to move synchronously and in opposite directions on substantially circular paths, which in the case of use of springs allows the contact between the plates to be maintained for a certain section, wherein the paths cross.

This elastic system of supporting the welding plates, although allowing the counterblow between the plates to be deadened and the risks of damage to the same to be reduced, has the disadvantage of not being able to vary the pressure of contact between the plates. This represents a problem for example when tubular strips having different technical features are welded, for example having a different thickness, which accordingly would require a greater or smaller contact pressure between the plates during welding. In fact, if they do not adequately compress the two edges of the strip, the risk of imperfect sealing of the package is incurred and the weld could later break, with the disadvantage that part of the product could leak or pollutants could penetrate the packaging, with serious damage particularly if the packaged product is one for nutritional use. On the other hand excessive pressure could ruin the external appearance of the package which would in this case be unattractive which would in turn make it unsaleable.

Moreover said springs, after having been subjected to a certain number of work cycles, break due to fatigue.

Another disadvantage noted in the use of traditional sealing devices concerns the fact that, if the material wherefrom it is formed or the thickness of the packaging strip requires a longer contact time, in order to provide a sufficient weld the strip feed rate has to be slowed down, i.e. reducing the packaging speed and hence reducing the quantity of units produced.

SUMMARY OF THE INVENTION

The object of the present invention is that of providing a device for sealing bags or packages in heat-sealable plastic, suitable preferably for use in a machine for packaging a loose product in bags or the like, which overcomes the disadvantages shown by previous sealing devices. More particularly it allows a contact pressure to be obtained between the welding elements which can be varied and controlled as required in accordance with the type and thickness of the packaging strip used, as well as such as to achieve the possibility of varying the length of time of contact without causing variations in the packaging speed of the machine.

Another object of the present invention is that of providing a sealing device which is suitable for being controlled fully automatically, by means of suitable computerised control means, in order to form part of a fully automated welding machine.

The previous objects are achieved by providing a device for sealing bags or packages in a heat-sealable plastic material containing a predefined portion of product, wherein a tubular strip is longitudinally fed and filled gradually with predetermined portions of product, while the sealing device, by welding the opposite edges of the tubular strip, defines a plurality of packages individually containing the predetermined portion of product. The sealing device comprises two welding plates or elements transverse to the strip and opposite one to the other and which are carried by a respective support element, and means for driving the supports of said two welding plates or elements to move one towards the other in such a way that the welding elements compress one against the other the edges of said tubular strip, forcing them to weld one to the other and to move away to allow the passage between the welding elements of the strip containing a portion of product, characterised in that at least a first and a second cylinder, which can be actuated by a pressurised fluid, are provided between each of the welding elements and the respective mobile support, the fluid-operable cylinders comprising a respective piston or plunger and a compression chamber, containing the piston, integral respectively with the corresponding welding element and with the corresponding support of the respective welding element, each of the pressure chambers having a connection for the pressurised fluid with a plenum element, so as to discharge therein the pressure increase which is generated inside the support cylinders chambers when the welding elements come into contact one with the other. At this stage it is possible either to maintain in the cylinders the pressure set before contact between the welding elements, or increase, after contact, the level of the pressure inside the cylinders to obtain a greater welding pressure.

In this way it is possible, by varying the pressure of the fluid in the cylinders-plenum circuit as required, to obtain a different contact pressure which allows the sealing device of the present invention to be adapted easily to the different types of plastic strip used for packaging the product.

Moreover with the device of the present invention it is possible, with the availability of computerised means for varying the pressure of the fluid in said circuit, to avoid intervention by any operator and provide a fully automated packaging machine wherein any type of strip for packaging can be used.

BRIEF DESCRIPTION OF DRAWINGS

The present invention will be made clearer on reading the following description, relating to a preferred embodiment of the invention, to be read with reference to the accompanying drawings, in which.

PREFERRED EMBODIMENT OF THE INVENTION

Figure 1:
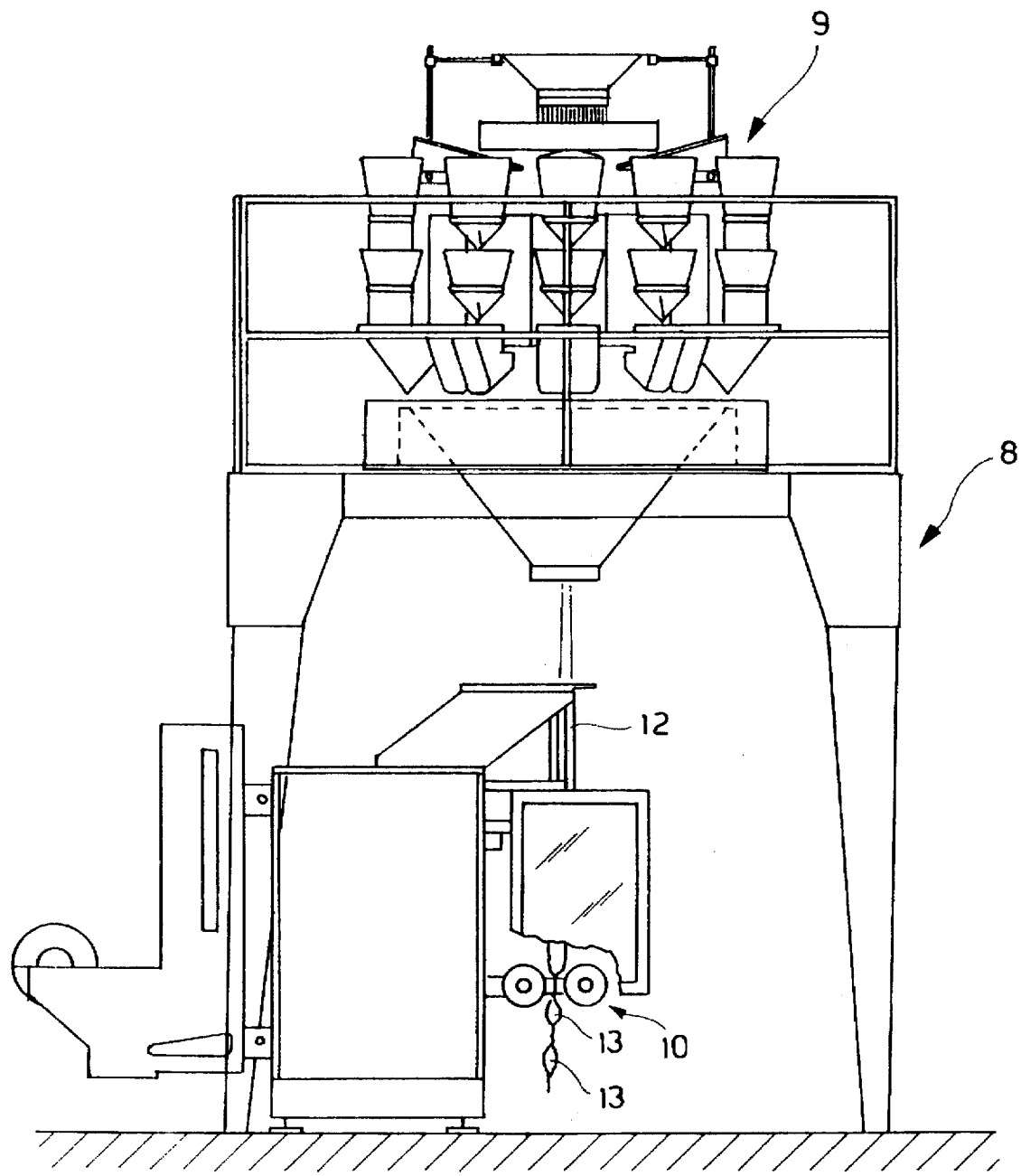
FIG. 1 is a schematic side view of a machine for packaging a product, with the sealing device of the present invention assembled thereon.

A packaging machine 8, with the device 10 of the present invention mounted thereon, is shown in FIG. 1. In said machine a loose product is adequately weighed and divided into portions by means of the upper unit 9 and is then fed into a tubular strip 12, which is longitudinally fed and filled gradually with the predetermined portions of product before being sealed to define individual packages of product 13 by means of the sealing device 10 of the present invention.

Figure 2:
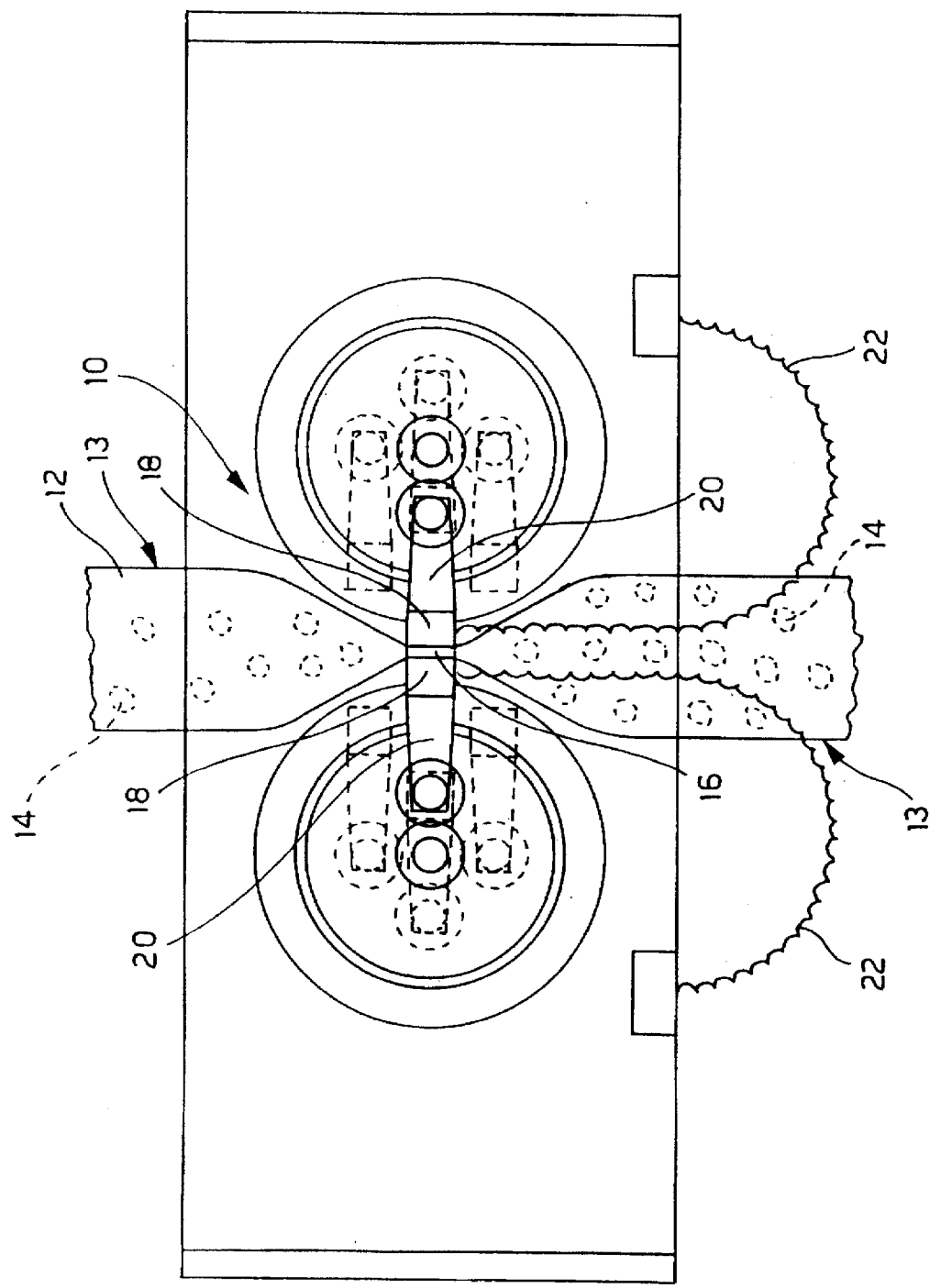
FIG. 2 is a schematic side view of the device for sealing bags according to a preferred embodiment of the present invention.

As is shown more clearly in FIG. 2, the tubular strip 12, which is fed longitudinally and filled gradually with predetermined portions of product 14, is welded in 16, by means of the sealing device 10 which, by pressing and heating the opposite edges of the tubular strip 12, provides the packages 13 containing individually the predetermined portion of product.

Figure 3:
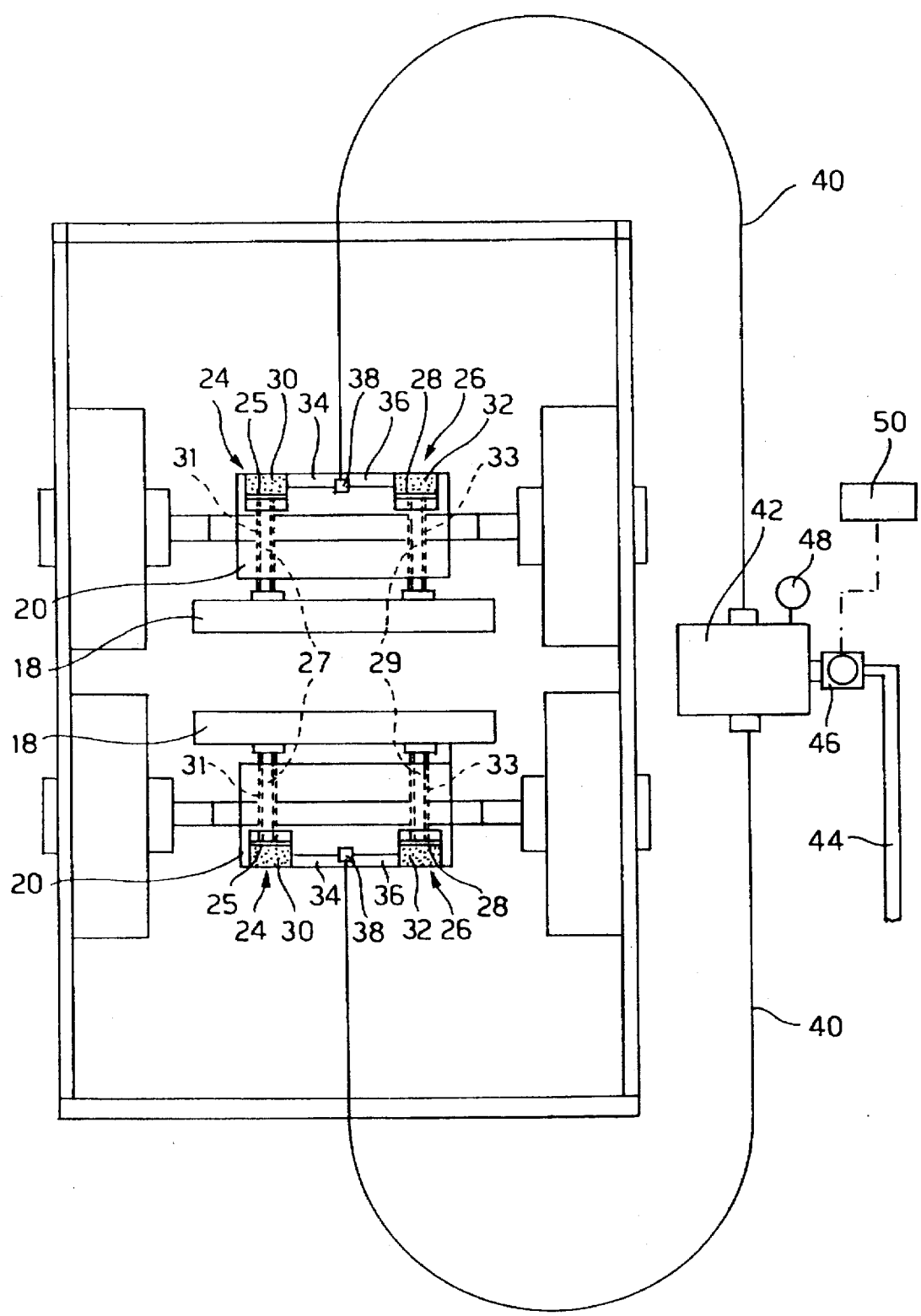
FIG. 3 is a plan view from above of the preferred embodiment of the device of the present invention.

With reference also to the subsequent FIG. 3, it can be seen that the sealing device comprises two opposite and transverse welding plates or elements 18, 18 wherein the strip 12 is made to pass and which are carried by a respective support element, denoted by reference numerals 20,20 respectively in the Figures.

The supports 20,20 of the two welding plates or elements 18, 18 are driven by suitable means, not described in detail here, to move synchronously along substantially circular paths in opposite angular directions, as shown by the dotted positions in FIG. 2, so that the welding elements are brought close one to the other and, by pressing the edges of the tubular strip one against the other for a certain longitudinal section, force them to weld one to the other, and are moved away to allow the passage between the same welding elements of the strip containing a portion of product.

Reference numeral 22 in FIG. 2 denotes electric wires for supplying electric current for heating the welding surfaces of the welding elements 18. According to the embodiment of the present invention shown, at least a respective first and second cylinder 24 and 26 respectively, transversely distanced one from the other and which can be actuated by means of a pressurised fluid, are provided, as shown more clearly in FIG. 3, for each of the two welding elements 18.

The fluid-operable cylinders 24,26 comprise a relative piston or plunger 25,28 integral by means of stems 27 and 29 with the respective welding element 18 and a respective compression chamber 30, 32 each containing the respective piston, integral with the support 20 of the welding element.

The stems 27, 29 are guided and supported by means of respective bushes 31 and 33 on the support elements 20.

Each of the pressure chambers 30,32 is connected, by means of a respective conduit 34, 36, to a respective element 38 for distributing the pressurised fluid, in turn connected, via a respective conduit 40, to a plenum element 42 capable of containing a certain quantity of compressed fluid.

The plenum 42 for the pressurised fluid allows discharge therein of the pressure increase which is generated in the support cylinder chambers when the welding elements come into contact one with the other, so as to maintain substantially a predefined contact pressure between the welding elements. The pressurised fluid, fed by a network 44 or another source, is fed into the plenum 42 by means of a suitable pressure regulator 46 and the pressure inside the plenum is measured by means of a pressure gauge 48.

50 in FIG. 3 denotes schematically means for setting the pressure which the regulator admits in the plenum 42.

The means 50 can be operated manually by the operator according to the production needs of that time, obtaining the necessary information from the pressure gauge 48, or could be actuated automatically by suitable computerised control means.

According to a preferred mode of operation, provision could also be made, in order to make the impact between the welding elements extremely soft, but at the same time obtain a considerable contact pressure, during welding, for causing a certain and not excessive pressure to flow first of all into the cylinders and, after the impact between the welding elements has taken place, to bring said pressure in the cylinders to a higher level, according to the particular material being processed.

According to the invention said cylinders are preferably pneumatic cylinders and the pressurised fluid is preferably compressed air.

In this case the volume of the plenum element could indicatively be approximately 10 times the volume of the chamber of each cylinder.

It is naturally understood that what has been written and shown in reference to the preferred embodiments of the present invention has been given purely by way of a non-limiting example of the principle claimed.

What is claimed is:

1. A sealing device for one of sealing bags and packages in a heat-sealable plastic material, each of said packages containing a portion of product, said packages being sealed in a packaging machine, wherein a tubular strip is longitudinally fed and gradually filled with said portion of product, said sealing device comprising:

at least two welding elements transverse to said strip and opposite one another;

a respective support element carrying each of said at least two welding elements;

means for driving the support elements of said at least two welding elements along a respective circular path to move said support elements close to one another and a longitudinal section moving with the web so that said at least two welding elements compress opposite edges of said tubular strip against each other, thereby welding said edges, and to separate said support elements for allowing passage of said tubular strip between said at least two welding elements, said sealing device, by welding the opposite edges of said tubular strip, defining a plurality of packages;

said driving means comprising at least a first and a second cylinder for a pressurized fluid provided between each of said at least two welding elements and their respective support elements, said first and second cylinders for the pressurized fluid having a respective piston and a respective compression chamber, each respective compression chamber containing the respective piston, said piston being integral respectively to one of said at least two welding elements corresponding thereto and being integral respectively to one of the support elements corresponding thereto, each of said compression chambers containing a pressurized fluid having a fluid pressure that is maintained substantially at a constant level for allowing said at least two welding elements to be pressed against each other along said longitudinal section when the circular paths of the at least two welding elements cross.

2. A sealing device, according to claim 1, further comprising means for regulating the fluid pressure inside said compression chambers.

3. A sealing device, according to claim 2, wherein the fluid inside the compression chambers is at a low pressure level, when the at least two welding elements enter into contact, and wherein the fluid pressure inside said compression chambers is increased, after the at least two welding elements contact to obtain a greater welding pressure.

4. A sealing device, according to claim 1, further comprising a plenum element connecting the compression chamber of cylinders for the pressurized fluid, said plenum element allowing discharge therein of pressure increase generated inside the chambers when said at least two welding elements come into contact with each other.

5. A sealing device, according to claim 3, wherein said means for regulating the fluid pressure inside said pressure chambers are means for regulating fluid pressure inside said plenum element.

6. A sealing device, according to claim 1, wherein said cylinders are pneumatic cylinders and the pressurized fluid is compressed air.

7. A sealing device, according to claim 1, wherein said pistons have stems, the stems of the pistons supporting the welding plates, the stems being guided and being supported by respective bushes on the support elements.

* * * * *